US008382270B2

(12) United States Patent
Sambhy et al.

(10) Patent No.: US 8,382,270 B2

(45) Date of Patent: Feb. 26, 2013

(54) CONTACT LEVELING USING LOW SURFACE TENSION AQUEOUS SOLUTIONS

(75) Inventors: Varun Sambhy, Penfield, NY (US); Bryan J. Roof, Pittsford, NY (US); Kock-Yee Law, Penfield, NY (US); Peter G. Odell, Mississauga (CA); Michelle N. Chretien, Mississauga (CA); Jennifer L. Belelie, Oakville (CA); Gordon Sisler, St. Catharines (CA); Christopher Wagner, Etobicoke (CA)

(73) Assignee: Xerox Corporation, Norwalk, CT (US)

( * ) Notice: Subject to any disclaimer, the term of this patent is extended or adjusted under 35 U.S.C. 154(b) by 473 days.

(21) Appl. No.: 12/814,741

(22) Filed: Jun. 14, 2010

(65) Prior Publication Data

US 2011/0304674 A1 Dec. 15, 2011

(51) Int. Cl.
*C09D 11/02* (2006.01)

(52) U.S. Cl. ......................... 347/100; 347/101; 347/105

(58) Field of Classification Search .................. 347/100, 347/101, 105
See application file for complete search history.

(56) References Cited

U.S. PATENT DOCUMENTS

| | | | | |
|---|---|---|---|---|
| 5,805,191 | A | 9/1998 | Jones et al. | |
| 2002/0027587 | A1* | 3/2002 | Sugaya et al. | 347/104 |
| 2002/0054198 | A1* | 5/2002 | Saijo | 347/101 |
| 2009/0141110 | A1 | 6/2009 | Gervasi et al. | |
| 2009/0142112 | A1 | 6/2009 | Gervasi et al. | |

* cited by examiner

*Primary Examiner* — Laura Martin

(74) *Attorney, Agent, or Firm* — Oliff & Berridge, PLC

(57) ABSTRACT

Release layers, and particularly low surface tension aqueous solutions, such as fountain solutions, which function as release layers. These release layers are integrated into copying and printing machines, such as xerographic machines, multifunctional devices, color systems, and the like, wherein the release layers are specifically incorporated onto a hydrophilic roll material for contact leveling of UV curable gel inks.

21 Claims, 4 Drawing Sheets

FIG. 6A
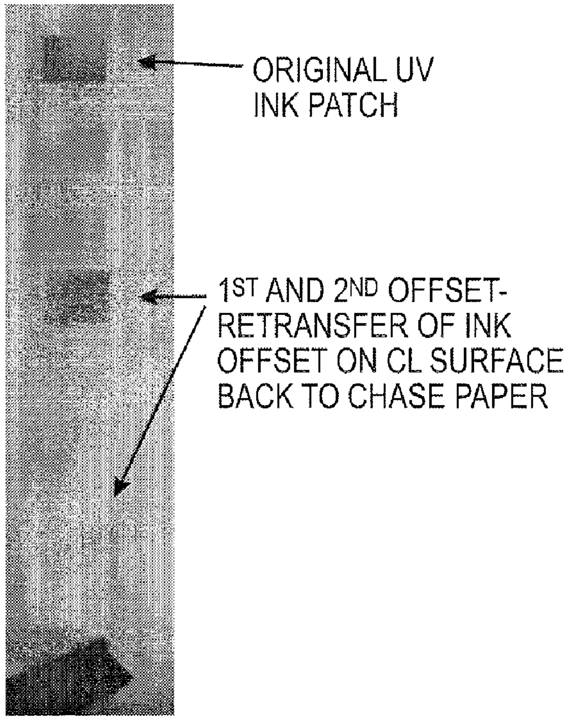
FIG. 6B

CONTACT LEVELING USING LOW SURFACE TENSION AQUEOUS SOLUTIONS

BACKGROUND

The present disclosure relates to release layers, and more specifically, to low surface tension aqueous solutions, such as fountain solutions, which operate as release layers. More particularly, the embodiments pertain to the aforementioned release layers and their integration into copying and printing machines, such as inkjet machines, multifunctional devices, color systems, and the like, wherein the release layers can be incorporated onto a hydrophilic roll material for contact leveling of UV curable gel inks.

Lithographic, flexographic, and gravure printing techniques have been known for many years. The basic principle of lithography is transferring ink from a surface having both ink-receptive and ink-repellent areas that comprise an image. Offset printing incorporates an intermediate transfer of the ink. In offset printing, an offset lithographic press transfers ink from a plate on a rotating cylinder to a rubber blanket cylinder, and then the blanket cylinder transfers the image to a substrate, which may be either a cut sheet or a web substrate. In flexographic printing, the ink is picked up in ink pockets on an anilox roll and transferred to a rubber plate having raised image areas that is mounted on a rotating cylinder. The flexographic plate then transfers the image to a sheet or web substrate. In gravure printing, engraved ink wells are arranged on a cylinder to form an image. When the ink wells contain ink and make direct contact with a sheet or web substrate, an ink image is transferred from the cylinder onto the substrate. The flexographic and gravure methods are especially useful for printing onto a web of film or foil material.

Ink jet printing systems often use either a direct printing architecture or an offset printing architecture. In a direct printing system, ink is ejected from jets in the printhead directly onto the final receiving web or substrate such as paper. In an offset printing system, the image is formed on an intermediate transfer surface and subsequently transferred to the final receiving substrate such as a web or individual substrate such as paper.

U.S. Patent Application Publication No. 2009/0141110, which is hereby incorporated by reference herein in its entirety, discloses a printing apparatus, including a) a printing station with at least one printhead for applying phase change ink to a substrate in a phase-change ink image, and b) an ink spreading station including a heated or unheated ink spreading member and a back-up pressure member in pressure contact with the ink spreading member, and wherein a nip is formed between the ink spreading member and the back-up pressure member for spreading the phase change ink image on the substrate, wherein said substrate is passed through the nip, and wherein the pressure member includes i) a substrate, and ii) an outer coating having a polymer matrix with an oleophobic resin, a fluoropolymer lubricant, and a first additive.

U.S. Patent Application Publication No. 2009/0142112, which is hereby totally incorporated by reference herein in its entirety, discloses an offset printing apparatus for transferring and optionally fixing a phase change ink onto a print medium including a) a phase change ink application component for applying a phase change ink in a phase change ink image to an imaging member; b) an imaging member for accepting, transferring and optionally fixing the phase change ink image to the print medium, the imaging member having: i) an imaging substrate, and thereover ii) an outer coating comprising a polymer matrix with an oleophobic resin, a fluoropolymer lubricant, and a first additive, and c) a release agent management system for supplying a release agent to the imaging member wherein an amount of release agent needed for transfer and optionally fixing the phase change ink image is reduced.

Regardless of the printing system that is being employed, there are many known printing applications for these systems that utilize heat-curable compositions. In these printing applications, the desired image, text or logo is applied to a substrate and then thermally cured. Typically, such heat curable compositions require the use of organic solvents that contain a significant amount of volatile organic compounds (VOCs). These VOCs escape into the atmosphere while the heat curable coating dries. As a result, these solvent based systems can be undesirable due to the environmental hazards and expenses associated with VOCs, such as water and air pollution and related expenses, namely the cost of complying with strict government regulations with respect to solvent emission levels.

In contrast, UV curable ink compositions contain reactive monomers instead of solvents, thereby eliminating many of the detrimental effects associated with VOCs. Another advantage to using UV curable ink compositions includes a typically high production rate for UV cure reactors. In particular, cross-linking of UV ink can occur in milliseconds, depending upon the color of the ink and the intensity of the UV light source. These advantages and various others have placed significant attention on UV inks as a significant player in future generations of printing technology Phase change inks, such as UV curable gel inks, are in the gel phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of ink drops. UV curable gel ink is typically jetted at a temperature of about 75° C. and has a melt viscosity at the jetting temperature of approximately 10 centipoise.

UV curable gel inks are desirable for ink jet printers because they remain in a solid phase at room temperature during shipping and have long term storage capabilities, among other reasons. In addition, problems associated with nozzle clogging as a result of ink evaporation with liquid ink jet inks are largely eliminated with UV curable gel inks, thereby improving the reliability of the ink jet printing. Furthermore, in phase change ink jet printers wherein the ink droplets are applied directly onto the final recording substrate (such as, for example, paper, transparency material, and the like), the droplets solidify immediately upon contact with the substrate, so that migration of ink along the printing medium is prevented and dot quality is improved.

Nevertheless, gel inks require some type of transformation such as curing to prevent them from running or smearing when printed onto a substrate and subjected to general handling. In addition, uncured gel inks stick to roller surfaces in print paths, making them unsuitable for many printing applications without some sort of transformation or curing.

Furthermore, while gel ink enables printing onto porous substrates, it unfortunately has also been observed to exhibit microbanding. Microbanding is an uneven distribution of ink in an image area in which the image should be smooth and uniform. Because the ink temperature drops after ejection, the ink freezes on contact with the substrate and an uneven distribution of ink on the image substrate may occur. The human eye can sometimes observe the uneven distribution as bands or lines in the direction of the substrate travel past the print head. This uneven distribution might be addressed by leveling the ink on the image substrate with a contact member, such as a roller, belt, or wiper, in an effort to normalize the ink distribution. Also leveling enables uniform gloss for better image quality, and facilitates line growth to compensate for missing or weak jetting.

For at least the reason that gel inks typically have a mayonnaise-like consistency, they also have very little cohesive strength prior to curing. In addition, gel inks are typically designed to have good affinity to many different types of materials. What this means is that that conventional methods for flattening a layer of ink tend to fail with respect to gel inks, because the gel ink splits. As the splitting occurs, the gel ink leaves a significant portion of the image behind on the device that is trying to flatten it, such as a traditional fuser roll typically used in xerography processes.

Thus, there is a desire to have the ink leveled prior to having it UV cured so that a more uniform gloss can be achieved, missing jets can be masked, and because certain applications such as packaging require thin layers of relatively constant thickness. Methods or means to prevent the occurrence of microbanding, ink splitting and ink offset would be beneficial.

In particular, one of the primary challenges relating to preventing the occurrence of ink splitting, offset or microbanding has been to identify and fabricate appropriate leveling surfaces or coatings that are capable of contacting a UV gel image in order to level the image, while remaining suitably ink-phobic in order to prevent ink offset to the contact leveling surface.

Typical approaches to addressing ink offset, ink splitting, microbanding and to improving image quality and gloss, particularly for UV curable gel inks, and in addition to those already mentioned include improving ink cohesion through changes in ink formulation or through partial curing. Another alternate approach involves using a thin low cohesion release layer placed between the leveling surface and the ink patch, whereby upon contact and separation between the ink patch and the release layer coated leveling surface, the lower cohesion release layer splits instead of the ink layer.

Thus, while known approaches are suitable for their intended purposes, a need still remains for improved contact leveling and release layers that can achieve offset free leveling, eliminate or significantly reduce the occurrence of ink splitting and/or microbanding, all while improving overall image quality and gloss.

BRIEF DESCRIPTION OF THE DRAWINGS

FIGS. 6A and 6B illustrate comparison of UV gel ink leveling without and with low surface tension solutions

SUMMARY

Figure 1:
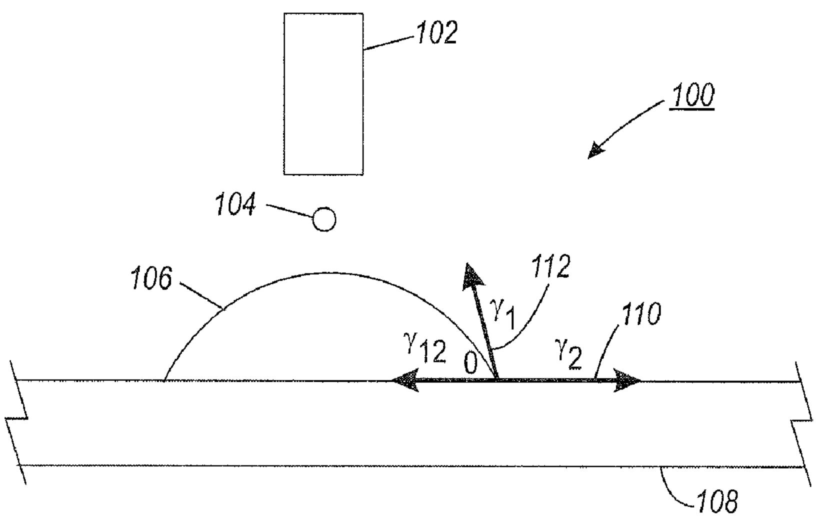
FIG. 1 is an illustration of a simplified ink jet printing system and a jetted ink droplet on a substrate.

In embodiments, method for contact leveling ink applied to an image receiving member is described, the method comprising:

applying ink from a print head to form an image on the image receiving member; and contacting the ink with a rotating contact member, wherein the rotating contact member comprises a hydrophilic surface layer, and a release layer is provided on top of the hydrophilic surface layer, wherein the release layer comprises a fountain solution, said fountain solution comprising a mixture of water, a water-soluble film-forming polymer, an acid component, a pH buffering agent, a wetting agent, a surface tension reducing component, a surfactant, and optionally one or more member selected from the group consisting of biocides, desensitizing agents, chelating agents, drying stimulators, and defoaming agents.

Further embodiments relate to an ink jet system comprising a contact leveling device, wherein the contact leveling device comprises of mechanism to pass paper or media through a pressure nip. The pressure nip can be between two rolls, roll on belt or belt on roll. The nip can be formed between surfaces that are rigid or conformable e.g. hard on soft, soft on soft or hard on hard. A fluid delivery system applies an aqueous release layer on the rollers. The fluid delivery system can be a roll dipping in a fountain solution bath and in contact with the rolls directly or through additional damping rollers.

In embodiments, the rollers are provided with a release layer, wherein the release layer is a fountain solution comprising a mixture of water, a water-soluble film-forming polymer, an acid component, a pH buffering agent, a wetting agent, a surface tension reducing component, a surfactant, and at least one member selected from the group consisting of biocides, desensitizing agent, chelating agents, drying stimulators, and defoaming agents.

EMBODIMENTS

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The terms "hydrocarbon" and "alkane" refer, for example, to branched and unbranched molecules having the general formula $C_nH_{2n+2}$, in which n is a number of 1 or more, such as of from about 1 to about 60. Exemplary alkanes include methane, ethane, n-propane, isopropane, n-butane, isobutane, tert-butane, octane, decane, tetradecane, hexadecane, eieosane, tetracosane and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups and the like.

The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about 2 to about 5 or from about 3 to about 4.

The term "curable" describes, for example, a material that may be cured via polymerization, including for example free radical routes, and/or in which polymerization is photoinitiated though use of a radiation-sensitive photoinitiator.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs. Similarly, the terms "two or more" and "at least two" refer, for example to instances in which two of the subsequently described circumstances occurs, and to instances in which more than two of the subsequently described circumstances occurs.

In embodiments, the term "hydrophilic" herein refers, for example, to a low contact angle, wherein the low contact angle is from less than about 45° to less than about 75°, when measured with water or fountain solution, with the surface.

Direct to paper as-is printed images can require image conditioning (leveling) to improve image quality and gloss, among other additional benefits.

FIG. 1 illustrates one embodiment of a simplified ink jet printing system 100. In the ink jet printing system 100, a printhead nozzle 102 jets ink droplet 104 directly to a final receiving substrate, such as paper 108, to form a printed image droplet 106 on the paper 108.

Due to surface energy profiles, the jetted ink drops bead up on the surface of paper, resulting in a contact angle θ being formed between the printed droplet 106 and the paper 108 as indicated by arrows 110, 111, 112, wherein $\gamma_1$(T) is the surface tension of the ink, $\gamma_2$(T) is the surface tension of the paper, $\gamma_{12}$(T) is the interfacial tension between the paper 108 and the ink 106, and wherein the force balance in the plane of paper is described by the following equations:

$$\rightarrow\gamma_1(T)\cos\theta+\gamma_{12}((T)=\gamma_2(T);\text{ and}$$

$$\rightarrow\cos\theta=(\gamma_2(T)-\gamma_{12}(T))/\gamma_1(T)$$

Contact angle pinning, along with the presence of intermittent missing and weak jets, can lead to non-uniform and streaky ink profiles, thereby resulting in low image quality and low image gloss. Several approaches have been proposed to condition a printed image, such as non contact techniques including thermal reflow, air knife shearing, modifying the ink formulation to achieve a 120 micrometer line width, and contact leveling techniques.

Figure 2:
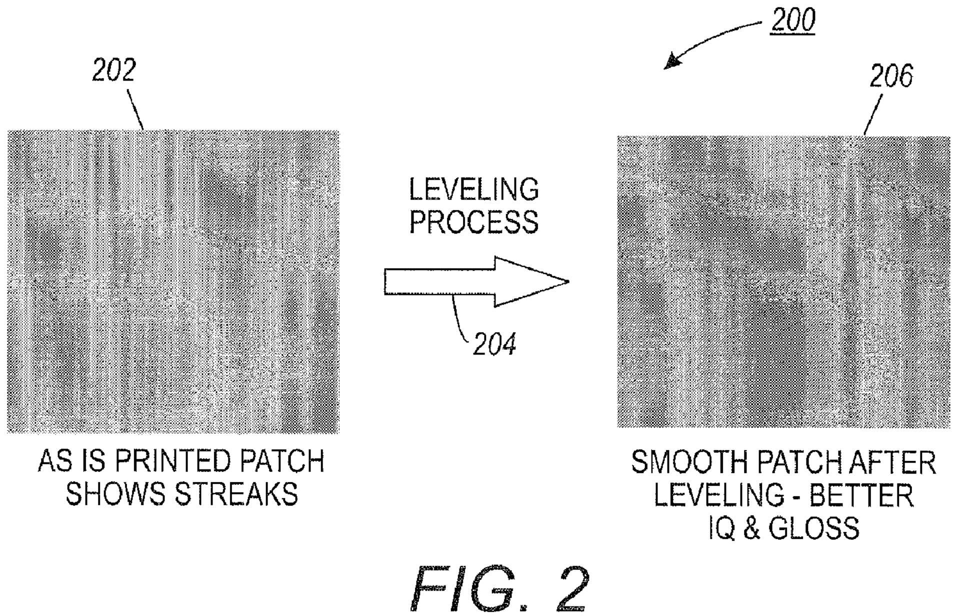
FIG. 2 is an illustration of a printed ink image before and after image conditioning in accordance with the present disclosure.

FIG. 2 illustrates one embodiment of a process according to the present disclosure 200 wherein an as-is printed image 202 having an undesirable streaky ink profile is treated by a leveling process 204 to provide a conditioned image 206. Conditioned image 206 exhibits a smooth image having improved overall image quality (IQ) and improved image gloss.

Leveling the gel ink with a contact member may cause the ink layer to split, however. As discussed above, a portion of the gel ink may be transferred to the contact member and affect the resulting print quality of later processed images. For example, a portion of the ink transferred from a rotating contact member may later be deposited onto the media and leave a ghost of the previously leveled image. Furthermore, ink build up on a contact member necessitates either replacement of the contact member or removal of the ink from the contact member on a periodic or occasional basis. Consequently, addressing the microbanding defect of gel ink in an image without splitting the ink or accumulating ink on a contact member would be beneficial and useful.

In embodiments, to prevent the occurrence of ink offset, ink splitting and microbanding by contact leveling, an effective approach with respect to contact leveling of the image requires preventing the ink from leaving the image, while at the same time removing the release layer.

In the present disclosure, low surface tension aqueous solutions (fountain solutions) are incorporated as release layers on a hydrophilic roll material in order to achieve contact leveling in applications involving UV curable ink gels.

In further embodiments, an ink jet printing apparatus is disclosed comprising a printing station including at least one printhead for applying ink to an image receiving substrate to create an ink image, wherein the ink comprises an UV curable gel ink; a contact leveling member for conditioning the ink image by disposing the contact leveling member in pressure contact with the ink image; wherein the contact leveling member comprises a substrate and an aqueous low surface tension solution disposed over the substrate.

In embodiments, the surface tension of the solution can be between about 5 to 50 dynes/cm, such as about 10 to 37 dynes/cm or about 15 to 25 dynes/cm.

Figure 3:
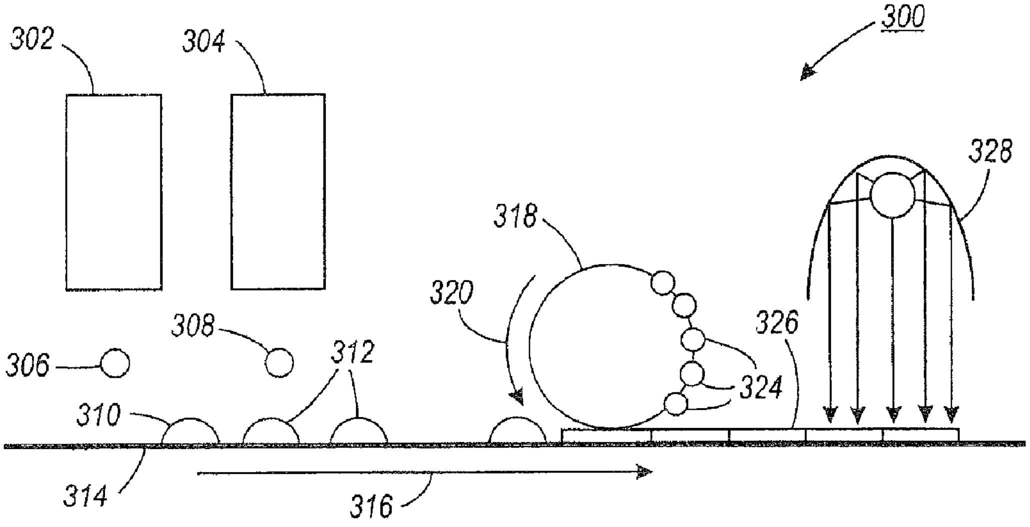
FIG. 3 is an illustration of ink offset on a previously available contact leveling surface.

With reference to FIG. 3, one embodiment of an ink jet device using the contact leveling process 300 of the present disclosure includes ink jet printheads 302 and 304 for jetting ink droplets 306 and 308, which form jetted ink image droplets 310 and 312 on substrate 314, such as paper.

Substrate 314 moves in the direction of arrow 316 towards a conditioning station including contact leveling roller 318, which moves in the direction of arrow 320. Problematically, offset occurs wherein droplets 324 adhere to the contact leveling roller 318.

In FIG. 3, the printed image 326 advances in the direction of arrow 316 to UV curing station 328 wherein the ink image is cured. Curing of the ink can be effected by exposure of the ink image to actinic radiation at any desired or effective wavelength, such as from about 250 to about 350 nanometers, or from about 350 to about 450 nanometers, although the wavelength can also be outside of these ranges. Exposure to actinic radiation can be for any desired or effective period of time, such as from about 0.001 to about 0.01 seconds, or from about 0.01 to about 1 second, or from about 1 to about 5 seconds, although the exposure period can also be outside of these ranges in cases where it is desired.

By "curing" it is meant that the curable compounds in the ink undergo an increase in molecular weight upon exposure to actinic radiation, such as (but not limited to) crosslinking, chain lengthening, or the like. In embodiments directed to a non-UV curable system, curing station 328 would be omitted, or an alternate curing device would be provided, depending on the nature of the ink selected.

Figure 4:
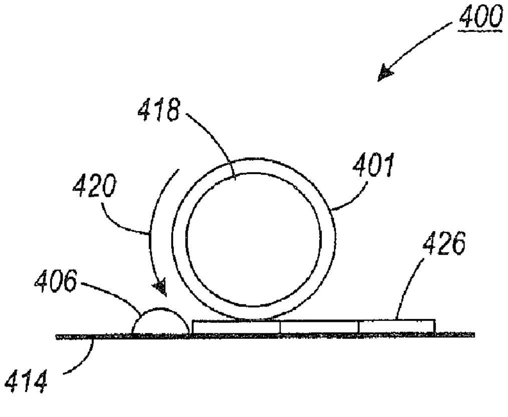
FIG. 4 is an illustration of a contact leveling surface with low surface tension solution in accordance with the present disclosure wherein there is no ink offset.

With reference to FIG. 4, another embodiment of a system 400 is illustrated, wherein a low surface tension solution in accordance with the present disclosure 401 is disposed on contact leveling roller substrate 418. Contact leveling roller substrate 418 moves in the direction of arrow 420. Ink jet printheads, UV curing station, etc., are not shown in FIG. 4 for purposes of simplification, but would be generally depicted as shown in FIG. 3. Ink jet printheads (not shown) in FIG. 4 form jetted ink image droplet(s) 406. The printed image 426 advances in the direction of arrow (not shown) similar to that depicted in FIG. 3.

With reference to FIG. 4, it is to be understood herein that the present contact leveling roller 418 having the present low surface tension solution 401 can be disposed in ink jet printing devices currently known or to be developed and is not limited to the devices described herein. It is further to be understood herein that while described as a drum or roller, any desired configuration can be selected for the contact leveling device herein, such as a sheet, a film, a web, a foil, a strip, a coil, a cylinder, a drum, an endless strip, a circular disc, a belt including an endless belt, an endless seamed flexible belt, and endless seamless flexible belt, and endless belt having a puzzle cut seam, a weldable seam, and the like, without limitation.

The contact leveling roller 418 will typically form a nip with an opposing roller or other device (not shown) situated such that the contact leveling roller is in contact with the image side of the substrate and the opposing roller contacts the non-image side of the substrate.

Low Surface Tension Aqueous Solutions; Fountain Solutions

Low surface tension aqueous solutions, also referred to as fountain solutions, are known, and have been applied in a variety of uses. For example, fountain solutions have been used in the lithographic press industry as release layer to prevent ink transfer (no offset) to hydrophilic regions of a printing plate. However, fountain solutions have not previously been used in ink jet printing, particularly of UV gel inks, for contact leveling of the printed images. In embodiments, these low surface tension aqueous fluids or fountain solutions are used as release layers on a hydrophilic roll material for contact leveling of UV curable gel inks.

Fountain solutions of the present disclosure comprise water, a water-soluble film-forming polymer, an acid component, a pH buffering agent, solvents, wetting agents, surface tension reducing components, surfactants, and optional ingredients such as biocides, desensitizing agents, sequestering or chelating agents, and defoaming agents, in addition to others. Each of the components are combined or mixed in accordance with the specific requirements as applicable to the specific printing process or application in use.

As a general matter with respect to fountain solutions, alcohols, such as isopropanol, have been used in fountain solutions at up to about 30 percent volume concentration levels in order to achieve improved performance in operation of the printing system, along with high quality prints.

However, when the fountain solution is transported by the rotating contact member in the form of a thin film, volatile components, and particularly the alcohol, can be lost. Aside from the cost considerations in losing the alcohol by evaporation, safety considerations urge against its use. Thus, it is attractive to find suitable substitutes for the volatile alcohol that do not have the problems associated with using isopropyl alcohol.

Water Soluble Film-Forming Polymers

In embodiments, the fountain solution comprises a water soluble film-twining polymer, which serves to form a film to desensitize the non-image areas and render those areas hydrophilic. The water soluble film-forming polymer can also protect the background or non-image areas from oxidation, fingerprints, dirt and general sensitivity.

In embodiments, illustrative examples of water soluble film-forming polymers useful in fountain solution compositions of the present disclosure include natural and synthetic gums and other polymers, such as gum arabic, starch derivatives such as dextrin, enzyme-decomposed dextrin, hydroxypropylated enzyme-decomposed dextrin, carboxymethylated starch, phosphoric acid starch, octenyl succinated starch, complex sugars (e.g., polysaccharides), polyvinyl alcohol, vinyl co-polymers, alginate, and cellulose derivatives (e.g., carboxymethyl cellulose, carboxyethyl cellulose, methyl cellulose, hydroxyethylcellulose, hydroxypropylcellulose, hydroxybutylmethylcellulose), and mixtures thereof.

Acid Component

In embodiments, the acid component of the fountain solution comprises water-soluble organic acids, inorganic acids and/or salts thereof, and a combination thereof.

In embodiments, the acid component can be present in an amount of 0.05 to 3.0% based on the total weight of the solution, such as 0.1% to 2.25%, or 1.0 to 1.95% based on the total weight of the solution.

In embodiments, illustrative examples of organic acids useful in fountain solution compositions of the present disclosure include citric acid, gluconic acid, glycolic acid, sulfamic acid, tartaric acid, ascorbic acid, malic acid, maleic acid, lactic acid, acetic acid, malonic acid, levulinic acid, sulfanilic acid, p-toluenesulfonic acid, phytic acid, organic phosphonic acid, and mixtures thereof.

Illustrative examples of suitable inorganic acids and salts of the acids that can be utilized in embodiments include nitric acid, phosphoric acid, and sulfuric acid, and/or salts thereof such as magnesium nitrate, ammonium phosphates, phosphonates, and the like, and mixtures thereof.

pH Buffering or Adjusting Agents

In embodiments, if the pH of the fountain solution is too acidic, the fountain solution composition can result in corrosive action of the acid on the surface of the device on which it is applied, such as, for example, a rotating contact member. If the pH is towards the neutral or alkaline side, the water soluble film forming agent, such as gum Arabic, can cease to work properly.

Accordingly, in embodiments, a pH buffering or adjusting agent can be included in the acidic film-forming concentrate composition to adjust and maintain the pH at a desired range of about 2 to 6 pH, or about 3 to 5.5 pH. In embodiments, suitable buffering agents include organic and inorganic acids.

Illustrative examples of organic acid buffering agents in embodiments include, for example, citric acid, ascorbic acid, malic acid, tartaric acid, lactic acid, acetic acid, gluconic acid, acetic acid, hydroxyacetic acid, oxalic acid, malonic acid, levulinic acid, sulfanilic acid, p-toluenesulfonic acid, phytic acid, an organic phosphonic acid and the like. As an inorganic acid buffering agent, illustrative examples include phosphoric acid, nitric acid, sulfuric acid, polyphosphoric acid and the like.

Further in embodiments, alkali metal salts, alkaline earth metal salts, ammonium salts or organic amine salts of these organic and/or inorganic acids can be used, and such organic and inorganic acids and salts thereof can be used either alone or in combination of more than one.

In embodiments, in addition to using a pH buffering or adjusting agent for an acidic condition of 3 to 7 pH in the fountain solution of the present disclosure, a pH buffering agent can also be used with respect to an alkali condition of 7 to 12 pH. In this instance, suitable buffering agents include an alkali metal hydroxide, phosphoric acid, alkali metal salt, an alkali metal salt of carbonic acid, silicate and the like.

Illustrative examples of suitable buffering agents that can be utilized in embodiments also include alkalis or caustics such as ammonium hydroxide, and alkali metals such as sodium hydroxide, sodium carbonate, potassium hydroxide, potassium carbonate, among others; and organic amines such as monoethanolamine, ethylenediamine, and triethanolamine, and mixtures thereof, among others.

Water-Soluble Glycol Solvents

In embodiments, water-soluble glycol solvents can also be added to the fountain solution in order to maintain a hydrophilic environment.

Illustrative examples of suitable glycol solvents that can be utilized in embodiments include glycerine and glycols such as ethylene glycol, polyethylene glycol, diethylene glycol, triethylene glycol, propylene glycol, dipropylene glycol, tripropylene glycol, and hexylene glycol, and mixtures thereof, among others.

In embodiments, glycol solvents can be optionally present in an amount of up to 50% based on the total weight of the solution, such as 15 to 40% or 25 to 35% based on the total weight of the solution.

Biocides

In embodiments, biocides can be added to the fountain solution in a sufficient amount to inhibit growth of bacteria, fungus and yeast in the concentrate composition and ultimately in the fountain solution.

Illustrative examples of suitable biocides that can be utilized in embodiments include sodium benzoate, and quaternary ammonium salts such as quaternary ammonium chloride, dodeeyltrimethylammonium chloride, phenol or derivatives thereof, formalin, imidazole derivatives, sodium dehydroacetate, 4-isothiazolin-3-one derivatives, benzotriazole derivatives, derivatives of amidine and guanidine, derivatives of pyridine, quinoline and guanidine, derivatives of diazine and triazole, derivatives of oxazole and oxazine, bromonitropropanol, 1,1-dibromo-1-nitro-2-ethanol, 3-bromo-3-nitropentane-2,4-diol, and mixtures thereof.

In embodiments, biocides can be optionally present in an amount of up to 1.0% based on the total weight of the solution, such as 0.5% or 0.75% based on the total weight of the solution.

Sequesterants or Chelating Agents

In embodiments, a sequesterant or chelating agent can also be included in the fountain solution to counteract the effects of calcium ions in the water source, which can adversely affect printing and cause scumming to occur.

Illustrative examples of suitable chelating agents include ethylenediaminetetraacetic acid and potassium salts and sodium salts thereof; diethylenetriaminepentaacetic acid and potassium salts and sodium salts thereof; triethylenetetraminehexaacetic acid and potassium salts and sodium salts thereof; hydroxyethylethylenediaminetriacetic acid and potassium salts and sodium salts thereof; nitrilotriacetic acid and sodium salts thereof; organic phosphonic acids such as 1-hydroxy ethane-1,1-diphosphonic acid and potassium salts and sodium salts thereof; aminotri(methylenephosphonic acid) and potassium salts and sodium salts thereof, and phosphonoalkanetricarboxylic acids. Organic amine salts are also effective instead of the sodium salts or potassium salts of the chelating agents above. Among these, chelating agents which are stable in the fountain solution composition when used and do not inhibit printing property are selected.

In embodiments, a chelating agent can be present in an amount of 0.001 to 0.5% by weight, such as 0.002 to 0.25% based on the total weight of the fountain solution composition.

Desensitizing Agents

In embodiments, a desensitizing agent can be optionally included in fountain solutions of the present disclosure.

Illustrative examples of suitable desensitizing agents include nitrate compounds such as ammonium nitrate and alkali metal nitrates such as magnesium nitrate, potassium nitrate, sodium nitrate, among others; and phosphate compounds such as ammonium phosphate, and alkali metal phosphates such as potassium phosphate, sodium phosphates, and mixtures thereof, among others.

Drying Stimulator

In embodiments, the fountain solution can also contain a drying stimulator, such as cobalt chloride, which works to enhance the effectiveness of the drier in the ink. A drying stimulator is typically added when ink is not drying fast enough to prevent problems such as smudging, ink setoff and/or blocking.

In embodiments, suitable drying stimulators include cobalt chloride.

Defoaming Agents

In embodiments, defoaming agents can be incorporated to prevent formation of foam after the fountain solution composition is prepared. The presence of foam can interfere with even distribution of the fountain solution on the surface of the device, such a rotating contact member.

Illustrative examples of defoaming agents include 2-ethylhexanol, polysiloxane based polymers or commercial defoamers like Super Defoamer 225 available from Day International Inc., Dayton Ohio.

In embodiments, a defoaming agent can be optionally present in an amount of up to 2.0% based on the total weight of the solution, such as 1.0% or 0.75% based on the total weight of the solution.

Surfactants

In embodiments, surfactants can function as wetting agents and also increase the solubility of other components in the fountain solution composition.

In embodiments, the surfactant can be an anionic, a cationic or a nonionic surfactant.

Anionic Surfactants

Anionic surfactants contain electrically-polarized portions of molecules, which carry a negative charge. These negative portions attract the positively charged molecules in the solution e.g. fountain solution, to which the surfactant is added. As a result, molecules at the surface of the liquid become negatively charged. The mutual repulsion of like-charged areas reduces the cohesion between molecules and thereby reduces surface tension. For example, household soap, whose cleaning ability is based on increased wetting of surfaces, is an anionic surfactant.

Illustrative examples of anionic surfactants in embodiments include perfluorooctanoate (PFOA or PFO), perfluorooctanesulfonate (PFOS), perfluorobutanesulfonic acid, perfluorononanoic acid, perfluorooctanesulfonic acid, perfluorooctanoic acid, dioctyl sodium sulfosuccinate, ammonium lauryl sulfate and other alkyl sulfate salts, sodium laureth sulfate, also known as sodium lauryl ether sulfate (SLES), sodium lauroyl sarcosinate, sodium lauryl sulfate, sodium myreth sulfate, sodium palmate, sodium pareth sulfate, sodium stearate, sodium tallowate, alkyl benzene sultanate, and mixtures thereof, among others.

Cationic Surfactants

Cationic surfactants operate in a similar manner to anionic surfactants, the difference here being that the polar groupings in the surfactant are positively-charged, thereby attracting the negatively-charged portions of molecules in the solution, and thus leaving positive charges at the surface.

Illustrative examples of cationic surfactants in embodiments include cetyl trimethylammonium bromide (CTAB) or hexadecyl trimethyl ammonium bromide and other alkyltrimethylammonium salts, cetylpyridinium chloride (CPC), polyethoxylated tallow amine (POEA), benzalkonium chloride (BAC), benzethonium chloride (BZT), lauryl methyl gluceth-10 hydroxypropyl dimonium chloride, tetramethylammonium hydroxide, benzalkonium chloride, benzethonium chloride, bronidox, cetrimonium chloride, cetrimonium bromide, ammoniums such as dialkyl benzene alkyl ammonium chloride, lauryl trimethyl ammonium chloride, alkylbenzyl methyl ammonium chloride, alkyl benzyl dimethyl ammonium bromide, benzalkonium chloride and mixtures thereof, among others.

Non-Ionic Surfactants

Non-ionic surfactants contain molecules that have both positive and negative groupings and therefore can behave anionically or cationically, depending upon the makeup of the solution or composition to which the non-ionic surfactant is added.

In embodiments, non-ionic surfactants having a hydrophilic-lipophilic balance (HLB) of 1-10 can be used. Illustrative examples of non-ioinic surfactants in embodiments include acetylenic glycols such as 2,4,7,9-tetramethyl-5-decyne-4,7-diol and its ethoxylates, alkyl pyrollidones such as N-octyl-2-pyrollidone and N-dodecyl pyrollidone, propylene oxide/ethylene oxide (PO/EO) block copolymers, alcohol ethoxylates, silanes, aryl ethoxylates, polysorbates, esters of fatty acids, alkyl poly(ethylene oxide), alkylphenol poly(ethylene oxide), copolymers of poly(ethylene oxide) and poly (propylene oxide) (commercially referred to as poloxamers or poloxamines), alkyl polyglucosides, including octyl glucoside and decyl maltoside, fatty alcohols, including cetyl alcohol and oleyl alcohol, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, and mixtures thereof, among others.

In embodiments, a suitable surfactant solution can also be sodium dodecylbenzenesulphonate (SDS). The surface tension of the SDS surfactant solution is approximately 20 dynes/cm, three times lower than that of pure water, which is approximately 70 dynes/cm. It is hypothesized that the low surface tension of the SDS surfactant solution results in a splitting of the surfactant solution layer, rather than splitting of the ink layer, thereby enabling offset free leveling. Low surface tension also enables good wetting of the contact leveling roll.

In embodiments, the surfactant can be present in an amount of about 0.001 to 5% by weight compared to the total weight of the fountain solution composition, such as 0.1 to 2% by weight of the total weight of the fountain solution composition. In addition, in cases where it is desired, a combination of two or more surfactants can be employed.

In embodiments, the release layer is a thin layer of fountain solution applied to the rollers. During a printing operation, when a printed substrate, such as a piece of paper, having an ink patch passes through the roller, the release layer comes in-between the roller and ink. When the paper and roller separate, the release layer splits so that no ink is offset.

Release Layers

Release layers of the present disclosure can be made from the various fountain solutions as described in detail above.

In embodiments, a suitable thickness for a release layer is in the range of about 0.05 to about 5 microns, such as 1.5 to 4.25 microns, or 2.5 microns in thickness.

Release layers of the present disclosure have low surface tensions, such as from about 5 to 50 dyne/cm.

In embodiments, the release layer is applied to a hydrophilic roll material in order to achieve contact leveling in applications involving UV curable ink gels.

Hydrophilic Roll Materials/Hydrophilic Surface Materials

In embodiments, hydrophilic herein means a low contact angle, wherein the low contact angle is from less than about 45° to less than about 75°, when measured with water or fountain solution, with the surface.

In embodiments, suitable illustrative examples of hydrophilic roll materials or hydrophilic surface materials include steel; aluminum; titanic; silicon; glass; ceramics; gum Arabic; hydroxycellulose; hydrophilic polyacrylates such as cross-linked polyvinyl alcohol, polyHEMA; cross-linked polyacrylic acid; hydrophilic polystyrenes such as cross-linked polystyrene sulphonate; cross-linked polystyrene benzoates; hydrophilic polyurethanes; hydrophilic epoxies and hydrophilic silicones.

The fountain solution composition of the present disclosure stably produces printings with improved gloss and high image quality even through a continuous printing operation for a long period of time. In addition, the fountain solution composition of the present disclosure does not require the use of volatile organic solvents such as isopropyl alcohol, which has been conventionally used for fountain solution. Therefore, by using the fountain solution composition of the present disclosure as a release layer, ink splitting, ink offset and microbanding are significantly reduced or eliminated in printing processes using UV curable gel ink, while maintaining high image quality and improved gloss for images.

It will be apparent in view of the present disclosure that the specific amounts of each of the components used to prepare the fountain solution will vary depending on numerous factors. These factors include, but are not limited to, the types of devices, inks, and substrates used, as well as the specific application of the fountain solution. Furthermore, the exact formulation of the concentrate used in the fountain solution may depend on the water used, i.e., whether the water is soft, hard, neutralized or medium.

EXAMPLES

This disclosure will be illustrated further in the following Example.

Figure 5:
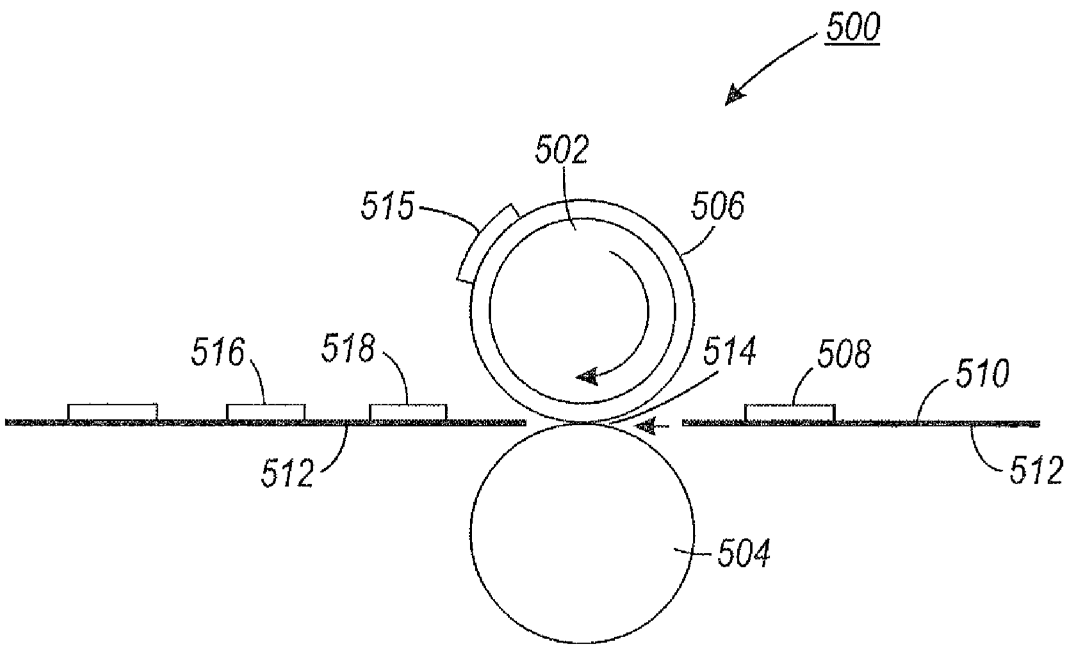
FIG. 5 illustrates an offline fixture used to evaluate contact leveling by surfaces having low surface tension solution as release layer.

A testing fixture 500 as shown in FIG. 5 was prepared to evaluate UV gel ink offset to the image conditioning surface. The tool (testing fixture) 500 consisted of two motor-driven, fixed distance soft silicone rollers 502, 504 (motor not shown). The roll speed was capable of being controlled to a speed of between 10 to 100 inches/sec. Test leveling surface 506 comprised of stainless steel sheet was fixed on the top roller 502 to simulate a leveling surface. An aqueous release layer solution (1.5% sodium dodecylbenzene sulphonate in water) was applied to the stainless steel leveling surface by soaking a cloth with the solution, and wiping the surface with the soaked cloth.

An approximately 12 micron thick cyan colored UV gel ink patch 508 was printed on an inkjet transparency 510, and a piece of transparency having the ink patch was then attached to an A3 size paper sheet 512. This A3 size paper sheet 512 was then fed into the silicone rollers 502, 504 such that the uncured UV gel ink patch 508 passed through the roller nip 514 and came into contact with the test leveling surface 506.

The speed of the silicone rollers 502, 504 was 100 inches/second. Any UV ink offset 515 to the test leveling surface 506 was re-transferred back to the paper sheet 512 in the next revolution as the roller is continuously rotating, and the offset ink material 515 showed up as 1st and 2nd offset patch 516, 518 on paper sheet 512. Ink offset with and without applying 1.5% sodium dodecylbenzene sulphonate release solution was then evaluated and graded visually.

FIGS. 6A and 6B illustrate comparison of UV gel ink leveling without and with release solution respectively (1.5% sodium dodecylbenzene sulphonate in water). FIG. 6B displays pictures of UV ink patch leveled in the offline testing fixture using sodium dodecylbenzene sulphonate release solution. FIG. 6A displays pictures of a UV ink patch leveled in the offline testing without release solution. Clearly, in presence of a release solution according to the present disclosure, no offset was observed.

It is to be understood that the foregoing examples are only illustrative of representative fountain solutions, release layers and surfactant solutions, and that differing proportions and concentrations of the components are within the scope of the present disclosure. Accordingly, the foregoing examples should not be read to limit the scope of the present patent.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for contact leveling ink applied to an image receiving member, the method comprising:

applying ink from a print head to form an image on the image receiving member; and contacting the ink with a rotating contact member, wherein the rotating contact member comprises a hydrophilic surface layer, and a release layer is provided on top of the hydrophilic surface layer, wherein the release layer comprises a fountain solution, said fountain solution comprising a mixture of water, a water-soluble film-forming polymer, an acid component, a pH buffering agent, a wetting agent, a surface tension reducing component, a surfactant, and optionally one or more member selected from the group consisting of biocides, desensitizing agents, chelating agents, drying stimulators, and defoaming agents.

2. The method of claim 1, wherein the ink comprises a UV curable gel ink.

3. The method of claim 1, wherein the release layer has a thickness in a range of 0.05 to 2 microns.

4. The method of claim 1, wherein the surfactant is present in an amount in a range of 0.001 to 5% by weight with respect to the total weight of the solution.

5. The method of claim 1, wherein the surfactant is selected from the group consisting of: perfluorooctanoate, perfluorooctanesulfonate, perfluorobutanesulfonic acid, perfluorononanoic acid, perfluorooctanesulfonic acid, perfluorooctanoic acid, dioctyl sodium sulfosuccinate, ammonium lauryl sulfate and other alkyl sulfate salts, sodium laureth sulfate, also known as sodium lauryl ether sulfate (SLES), sodium lauroyl sarcosinate, sodium lauryl sulfate, sodium myreth sulfate, sodium palmate, sodium pareth sulfate, sodium stearate, sodium tallowate, alkyl benzene sulfonate, and mixtures thereof.

6. The method of claim 1, wherein the surfactant is selected from the group consisting of: acetylenic glycols, alkyl pyrollidones, propylene oxide/ethylene oxide (PO/EO) block copolymers, alcohol ethoxylates, silanes, aryl ethoxylates, polysorbates, alkyl poly(ethylene oxide), alkylphenol poly (ethylene oxide), copolymers of poly(ethylene oxide) and poly(propylene oxide), alkyl polyglucosides, including octyl glucoside and decyl maltoside, fatty alcohols, including cetyl alcohol and oleyl alcohol, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxypoly(ethyleneoxy) ethanol, and mixtures thereof.

7. The method of claim 1, wherein the surfactant comprises sodium dodecylbenzenesulphonate.

8. The method of claim 1, wherein the hydrophilic surface layer comprises a material selected from the group consisting of steel, aluminum, titania, silicon, glass, ceramics, gum Arabic, hydrophilic polyacrylates, polyurethanes, epoxies and hydrophilic silicones.

9. The method of claim 1, wherein the surfactant has a surface tension of approximately 20 dynes/cm.

10. The method of claim 1, wherein at least one biocide is present and selected from the group consisting of sodium benzoate, and quaternary ammonium salts such as quaternary ammonium chloride, dodecyltrimethylammonium chloride, phenol or derivatives thereof, formalin, imidazole derivatives, sodium dehydroacetate, 4-isothiazolin-3-one derivatives, benzotriazole derivatives, derivatives of amidine and guanidine, derivatives of pyridine, quinoline and guanidine, derivatives of diazine and triazole, derivatives of oxazole and oxazine, bromonitropropanol, 1,1-dibromo-1-nitro-2-ethanol, 3-bromo-3-nitropentane-2,4-diol, and mixtures thereof.

11. The method of claim 1, wherein at least one cheleating agent is present and selected from the group consisting of ethylenediaminetetraacetic acid and potassium salts and sodium salts thereof; diethylenetriaminepentaacetic acid and potassium salts and sodium salts thereof; triethylenetetraminehcxaacetic acid and potassium salts and sodium salts thereof; hydroxyethylethylenediaminetriacetic acid and potassium salts and sodium salts thereof; nitrilotriacetic acid and sodium salts thereof; organic phosphonic acids such as 1-hydroxy ethane-1,1-diphosphonic acid and potassium salts and sodium salts thereof; aminotri(methylenephosphonic acid) and potassium salts and sodium salts thereof, phosphonoalkanetricarboxylic acids, and mixtures thereof.

12. The method of claim 1, wherein at least one desensitizing agent is present and is selected from the group consisting of nitrate compounds such as ammonium nitrate and alkali metal nitrates such as magnesium nitrate, potassium nitrate, sodium nitrate, among others; and phosphate compounds such as ammonium phosphate, and alkali metal phosphates such as potassium phosphate, sodium phosphates, and mixtures thereof.

13. The method of claim 1, wherein at least one cheleating agent is present in an amount of from about 0.001 to 0.5% by weight, based on the total weight of the fountain solution, and the cheleating agent is selected from the group consisting of ethylenediaminetetraaeetic acid and potassium salts and sodium salts thereof; diethylenetriaminepentaacetic acid and potassium salts and sodium salts thereof; triethylenetetraminehexaacetic acid and potassium salts and sodium salts thereof; hydroxyethylethylenediaminetriacetic acid and potassium salts and sodium salts thereof; nitrilotriacetic acid and sodium salts thereof; organic phosphoric acids such as 1-hydroxy ethane-1,1-diphosphonic acid and potassium salts and sodium salts thereof; aminotri(methylenephosphonic acid) and potassium salts and sodium salts thereof; and phosphonoalkanetricarboxylic acids.

14. The method of claim 1, wherein at least one drying stimulator is present and comprises cobalt chloride.

15. The method of claim 1, wherein the hydrophilic surface layer has a water or fountain solution contact angle from less than about 45° to less than about 75°.

16. An ink jet system comprising a contact leveling device, wherein the contact leveling device comprises a set of rollers provided with hydrophilic surface layer and a release layer provided on top of the hydrophilic surface layer, wherein the release layer is a fountain solution comprising a mixture of water, a water-soluble film-forming polymer, an acid component, a pH buffering agent, a wetting agent, a surface tension reducing component, a surfactant, and at least one member selected from the group consisting of biocides, desensitizing agent, chelating agents, drying stimulators, and defoaming agents.

17. The ink jet system of claim 16, wherein the surfactant comprises sodium dodecylbenzenesulphonate.

18. The ink jet system of claim 16, wherein the surfactant is present in an amount of from about 0.001 to 5% by weight with respect to the total weight of the fountain solution.

19. The ink jet system of claim 16, wherein the ink jet system utilizes UV curable gel ink.

20. The ink jet system of claim 16, wherein the hydrophilic surface layer comprises a material selected from the group consisting of steel, aluminum, titania, silicon, glass, ceramics, gum Arabic, hydrophilic polyacrylates, polyurethanes, epoxies and hydrophilic silicones.

21. The ink jet system of claim 16, wherein the surfactant is selected from the group consisting of: perfluorooctanoate, perfluorooctanesulfonate, perfluorobutanesulfonic acid, perfluorononanoic acid, perfluorooctanesulfonic acid, perfluorooctanoic acid, dioctyl sodium sulfosuccinate, ammonium lauryl sulfate and other alkyl sulfate salts, sodium laureth sulfate, also known as sodium lauryl ether sulfate (SLES), sodium lauroyl sarcosinate, sodium lauryl sulfate, sodium myreth sulfate, sodium palmate, sodium pareth sulfate, sodium stearate, sodium tallowate, alkyl benzene sulfonate, and mixtures thereof.

* * * * *